United States Patent [19]
Corwin

[11] 4,178,503
[45] Dec. 11, 1979

[54] MARKING MESSAGE CARD AND TEMPLATE ASSEMBLY AND RELATED INPUT SWITCHING CIRCUITRY AND METHOD OF MAKING THE ASSEMBLY

[76] Inventor: Edward J. Corwin, 200 Central Park South, Apt. 11A, New York, N.Y. 10019

[21] Appl. No.: 941,897

[22] Filed: Sep. 12, 1978

Related U.S. Application Data

[60] Division of Ser. No. 750,322, Dec. 13, 1976, Pat. No. 4,127,769, which is a continuation-in-part of Ser. No. 257,298, May 26, 1972, Pat. No. 4,001,549, which is a continuation-in-part of Ser. No. 151,676, Jun. 10, 1971, abandoned.

[51] Int. Cl.² .................. G06K 21/06; G08C 9/06
[52] U.S. Cl. ................................. 235/495; 250/569
[58] Field of Search ............... 235/495; 35/37, 26; 250/569

[56] References Cited
U.S. PATENT DOCUMENTS

| | | | |
|---|---|---|---|
| 2,089,272 | 8/1937 | Lake et al. | 235/495 |
| 2,525,837 | 10/1950 | Simplair | 235/495 |
| 3,457,392 | 7/1969 | Dick | 235/495 |
| 3,610,893 | 10/1971 | Clark et al. | 235/495 |

*Primary Examiner*—Daryl W. Cook
*Attorney, Agent, or Firm*—Sughrue, Rothwell, Mion, Zinn and Macpeak

[57] ABSTRACT

A novel optically readable message card having columns of marking areas thereon where the vertically adjacent marking areas in a column are horizontally staggered. Also, a template for the message card and having columns of horizontally staggered marking openings therein corresponding to the marking areas on the message card. The horizontal staggering arrangement assures that an unskilled user will make a sufficiently long mark in the marking area on the message card so that the mark can be read by commercially available optical mark reading equipment. Furthermore, the staggered openings in the template assure the structural strength of the template. Also, a structurally strong, easy-to-use template assembly including the template and a base plate designed to hold the message card and accurately align it with the template. Also, a method of economically mass-producing the template assemblies. Also an input switching circuit for converting a conventional optical mark reader to one which can read the novel message card.

5 Claims, 16 Drawing Figures

MARKING MESSAGE CARD AND TEMPLATE ASSEMBLY AND RELATED INPUT SWITCHING CIRCUITRY AND METHOD OF MAKING THE ASSEMBLY

CROSS-REFERENCE TO RELATED APPLICATION

This is a division of application Ser. No. 750,322, filed Dec. 13, 1976, application Ser. No. 750,322 is a continuation-in-part of copending application Ser. No. 257,298, filed May 26, 1972, now U.S. Pat. No. 4,001,549, and which was a continuation-in-part of application Ser. No. 151,676 filed June 10, 1971, and now abandoned.

BACKGROUND OF THE INVENTION

1. Field of the Invention

The invention relates generally to the field of optically readable message cards and templates therefor, and, more particularly, to a novel arrangement of marking areas on the message card and the corresponding novel arrangement of openings in the template, and also to a novel template assembly for holding the message card and to a method of making the assembly.

2. Description of the Prior Art

In the prior art, the marking openings in the columns of a card marking template have been mostly horizontally-extending openings, for example, as shown in U.S. Pat. No. 2,525,837 issued Oct. 17, 1950. The resulting horizontal or slanted marks on the card which were used for electrically conductive mark-sensing, are not optically readable by commercially available more recent optical mark readers, such as IBM type 2501, 2502 or 3505. These readers require vertical marks. Using vertical openings for adjacent marking positions in a template of prior art is not feasible since the mark itself must be 0.170 inch long and the openings must extend at least 0.040 inch on each side of the mark to assure that good marks are made even with a dull pencil.

Since the distance between the centers of two vertically adjacent vertical marks is 0.250 inch, adjacent vertical openings would form one continuous slot instead of individual openings for each mark.

Although horizontal, as well as slanted, marks can be optically read by a more expensive, older IBM type 1287 optical scanner, they would require a template with widely spread out columns of openings in order to provide sufficient strength of said template and minimize errors.

SUMMARY OF THE INVENTION

The broad object of the invention is to provide an improved template and optically readable marking message card which can be used nationwide by millions of clerically unskilled persons with accuracy, assuring for them a direct access to computers.

Another object of the invention is to provide a template with openings arranged in such a manner that the template is structurally strong while at the same time using a minimum horizontal spacing for each usable column of openings.

A more specific object of the invention is to provide a template having a plurality of closely-spaced columns of marking openings therein, with vertically adjacent ones of the openings being horizontally staggered with respect to each other.

Another object is to make the staggered marking openings vertically extending in such manner that the template cards can be mass produced on commercial high-speed punches with a computer controlling the appropriate pattern of openings common to each batch of templates and generating for each template an individual validation pattern consisting of a template serial number and a random security code.

Another object is to provide a template with openings centered in such a manner as to leave solid, not slotted, strips ⅜" wide along both long edges of the template, thus increasing its structural strength.

Another object of this invention is to provide a template with openings about 0.250 inch long, to accommodate commercially used marks and the space required by thickness of a dull pencil on each end of the opening.

Another object is to provide a simple and light template assembly structure permitting an economical method of mass-production, reducing the wear of moving elements, facilitating the usage of the template and saving on postage, an important factor in very large volume mailings.

Still another object of the invention is to provide a novel template assembly including a template and a base member constituting means for accurately aligning the message card marking areas with respect to the openings in the template.

Another specific object of the invention is to provide a marking message card for use with such a template and having horizontally staggered, marking areas corresponding to the staggered openings in the template.

Another object is to make the staggered marking areas vertically extending.

Still another specific object is to arrange marking areas on the message card in lines, in a commonly familiar sequence within each line, more acceptable for average clerically unskilled persons than the columnar sequence of indicia of a Hollerith code.

Another object is to provide an input circuit for translating the input from these novel locations of marking areas into the conventional locations of input bits (within an Optical Mark Reader, such as, for instance, an IBM type 3505) corresponding to numerical values represented by the novel marking areas.

Another specific object of this invention is to provide an input switching circuit, which will transmit signals only from designated marking areas, such areas alternating in successive marking columns, thus eliminating the reading of overdrawn marks.

DESCRIPTION OF THE PREFERRED EMBODIMENTS

Figure 1:
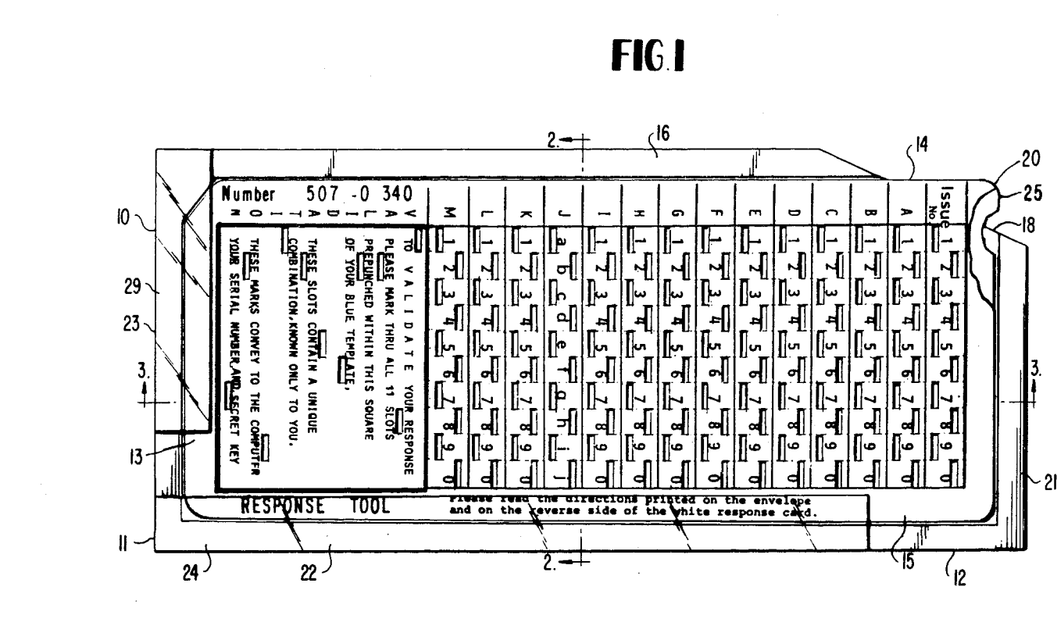
FIG. 1 is a plan view of a preferred embodiment of the novel template assembly.

FIG. 1 illustrates a preferred embodiment of a novel template assembly 10 comprising a base member 12 and a template 14.

Figure 2:
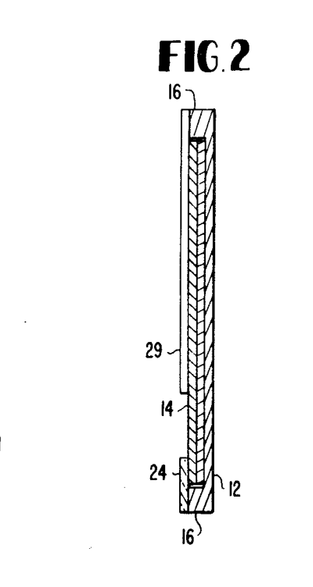
FIG. 2 is a sectional view taken along line 2—2 of FIG. 1. (The horizontal scale is expanded to show detail).
Figure 3:
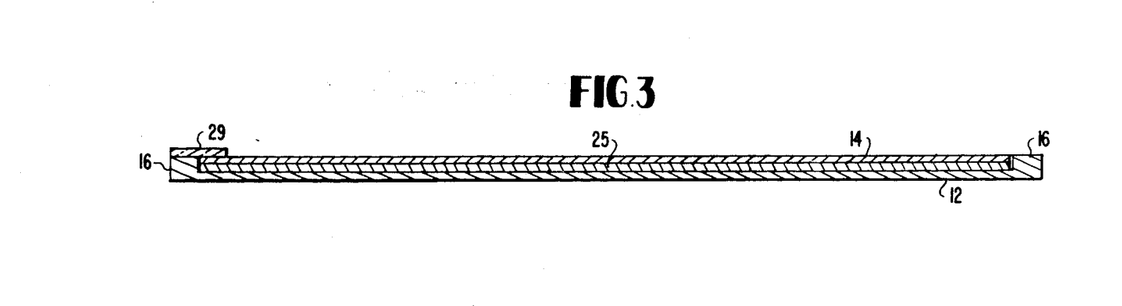
FIG. 3 is a sectional view taken along line 3—3 of FIG. 1. (The vertical scale is expanded to show detail.)

The base member 12 has a rim 16 formed therein and extending around most of the periphery of the base member to form a cavity corresponding to the shape of an IBM message card which is 7⅜ inches long and 3¼ inches high. The base member has a notch 18 formed in the upper right-hand corner thereof, and corresponds to the upper right-hand corner 20 of the template 14. There is no rim around the notch. The rim 16 is shown more clearly in the sectional views illustrated in FIGS. 2 and 3.

The base member 12 is preferably made of injection moldable or vacuum formable plastic material, and the template 14 is preferably made of commercially available, heavy duty punched card stock, even though the base member and the template may be made of other materials.

The template assembly can be achieved by an easy and economic fastening process using a commercially available adhesive tape dispenser, advancing a length of plastic adhesively coated strip 24 about one inch shorter than the length of the template. The free end of this long plastic strip 24 is pressed against the rim 16 at the lower left corner 11 of the base plate member 12 and then the remainder of said strip 24 is applied over the lower long portion 22 of the rim 16 and the lower long side 15 of the template 14, leaving the right end of the template free. Another (short) plastic strip 29 about one inch shorter than the width of the base member 12 is pressed against the left short portion 23 of the rim 16 and the left side 13 of the template 14.

Thus, a jacket-like structure is achieved, opened along most of the upper long edge and along the entire right short edge, and a small portion of the lower long edge of the template 14, while a small portion of the upper long side, almost the entire left short side, and almost the entire lower long side of the said template are adhesively joined by plastic strips to the respective portions of the rim 16 of the base member 12.

A message card 25 (FIG. 4) is then placed in the cavity of the base plate member 12 (within the rim 16) and under the template 14. The proper space in between the template and the base member cavity has been assured when the template 14 and the base member 12 were joined as described.

In addition to easy insertion and removal of the message card, this novel structure offers three important advantages:

it provides a positive stop for the message card being inserted;

it prevents the leading edge 35 (see FIG. 4) of the message card (while inserting) from hitting the edge of the left short portion 23 of the rim 16. The damage of the leading edge is one of the main causes of jamming the transport mechanism in a card reader. To further reduce the possibility of a damage to the leading edge of the message card 25, the diagonally cut corner 31 (see FIG. 4) has been modified by surrounding it with two round corners 32 and 33.

it reduces the manufacturing cost as described below.

The jacket-like structure practically eliminates the bending motion of the joining plastic strips, replacing it with a slight curving bend of the template card at the time the message card is being inserted. It also very substantially increases the length of the joint as compared to the hinge used in the initial design, shown in Applicant's pending application filed on May 26, 1972. As a result of these two factors, the wear of the joining strip is reduced so much that a thin commercial transparent pressure-sensitive adhesive tape is used. Thus, the underlying portion of the template can contain a printed description visible through the tape.

The short hinge shown in FIG. 1 of the pending application filed on May 26, 1972 required a strong, heat-sealable plastic strip which had to be exactly positioned. Another embodiment shown in FIG. 10 of said pending application required complicated fixtures to assure proper alignment of the template card with the base member during the assembling operation. In the novel embodiment shown in FIG. 1 of the present application, the template card is merely placed within the cavity, both plastic strips start at the edge of the base member and do not require precise positioning, and, thus, the assembling operation is simplified and made less costly than in the structures described in the previous application.

It has to be noted that the template could be transparent rather than opaque. In this form of invention the indicia and other information need not be printed on the template 14 since, when the message card 25 is inserted into the template assembly, the printing on the message card is visible through the transparent template.

Figure 4:
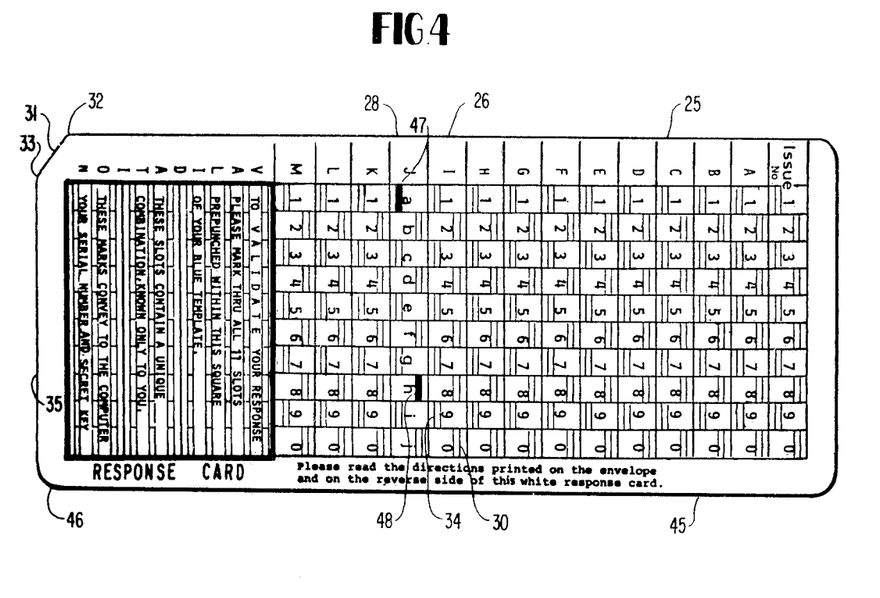
FIG. 4 is a plan view of a preferred embodiment of the novel marking message card.

FIG. 4 illustrates a standard IBM card designed for optical mark reading by an IBM type 3505 card reader with an optical mark reading feature, except that the novel marking areas are arranged thereon in accordance with the principles of this invention. The card contains several fields of columns of marking areas and corresponding indicia, but the fields 26 and 28 are of primary interest with respect to the invention. Field 26 contains a column of numerical indicia 1, 2, . . . 8, 9, 0. In order to describe the advantage of the present invention, we will look, as an example, only at the column of indicia in field 26. On the right side of the numeral "0", there is a rectangular box 30 which defines a vertically-extending marking area which is to be marked with an ordinary black pencil, for example.

The vertical direction is defined as the direction of a marking column, which is parallel to the short side of the template, or message card, regardless of the way the corresponding indicia are printed.

The vertical length of each box indicates the limits of the vertical mark which should be placed in the marking area to assure that the mark is readable by conventional optical mark reading equipment.

It can be seen that, if the marking area for the next vertically adjacent numeral "9", were disposed immediately above that for the numeral "0", the two marking areas would touch each other, and that the marking areas for the "0" and the "9" would be so close to each other that a person marking the "0" marking area, for example, might inadvertently extend his mark into the marking area for the numeral "9". However, according to my invention, the marking area for the numeral "9" is defined by a rectangular box 34, disposed horizontally adjacent to the left-hand side of the numeral "9". In other words, the marking areas for vertically adjacent indicia in the column are horizontally staggered with respect to each other. This same staggering arrangement can be observed for the other indicia in the card field 28.

Even though, in effect, two potential marking columns on the message card are utilized to provide the marking areas for one vertical column of indicia, because of the use of vertical marking areas as opposed to the slanted and horizontal marking areas of the prior art, the total card width required for the two columns of marking areas, when read by an IBM type 3505 card reader, is only 0.348 inch. The field 28 of the message card 25 contains alphabetical indicia rather than numerical indicia, but the horizontal staggering of the marking areas for vertically adjacent alphabetical characters is the same as in the numerical field 26.

The horizontal staggering of the marking areas in fields 26 and 28 is important, because in the proposed audience communication system in which the message card is designed to be used, it is possible that vertically adjacent marking areas would be marked. However, in the reference fields of the document, such as the validation field, the horizontal staggering of the marking areas is not required since the information represented by the indicia is such that two vertically adjacent marking areas are never marked.

Figure 5:
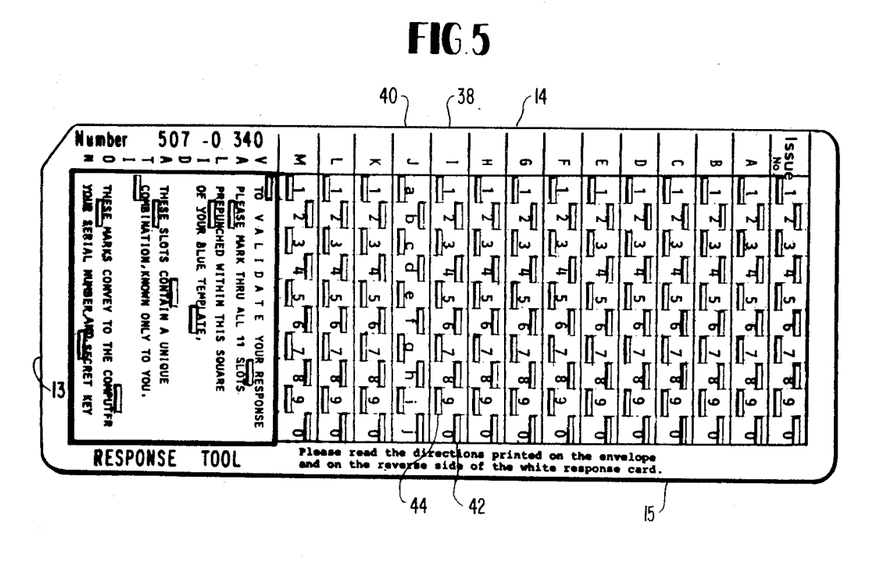
FIG. 5 is a plan view of a preferred embodiment of the novel template.

FIG. 4 also shows two typical optically readable marks 47 and 48, which have been made on the message card field 28 using the template assembly 10, shown in FIG. 1, or the template card 14 alone, shown in FIG. 5, manually aligned with the message card.

It has to be noted that the indicia of the marking areas in each column of numerical information, such as in the field 26, are now placed in one line, like the printed lines in a book. The sequence of indicia used in this invention is 1, 2, . . . 8, 9, 0, which resembles more the series of numbers encountered in daily usage, and is easier to grasp for a clerically unskilled person than a vertical column of indicia, descending from 0, 1, 2, . . . to 8, 9, as commonly used in data processing practice.

FIG. 5 illustrates a preferred embodiment of the template 14 which is shown in FIG. 1 as a part of the template assembly 10. Even though the template has several vertical fields, the fields of primary importance to this invention are fields 38 and 40 which correspond to the fields 26 and 28, respectively, on the message card 25 illustrated in FIG. 4.

Again, as an example, we will look at the indicia 1, 2, . . . 8, 9, 0 in field 38. One set of vertically-extending marking openings is located horizontally adjacent the right-hand side of the even-numbered indicia, and another set of such openings are located horizontally adjacent the left-hand side of the odd-numbered indicia. That is, the marking openings for vertically adjacent indicia are horizontally staggered with respect to each other.

More specifically, when template 14 is properly aligned with the message card 25, marking openings 42 and 44 overlie and are aligned with the vertically extending marking areas defined by marking boxes 30 and 34, respectively, on the message card illustrated in FIG. 4. The vertical marking areas for the template field 40 are also horizontally staggered relative to the column of alphabetical indicia or descriptive indicia if such are used.

If the vertical openings in template 14 were not staggered, but instead were placed one beneath the other, they would form a continuous slot in the template, thereby resulting in a structurally weak card and also increasing the likelihood that a mark made in one marking area of the messsage card would inadvertently extend into a vertically adjacent marking area, thereby causing an error upon readout.

Figures 6, 7, 8:
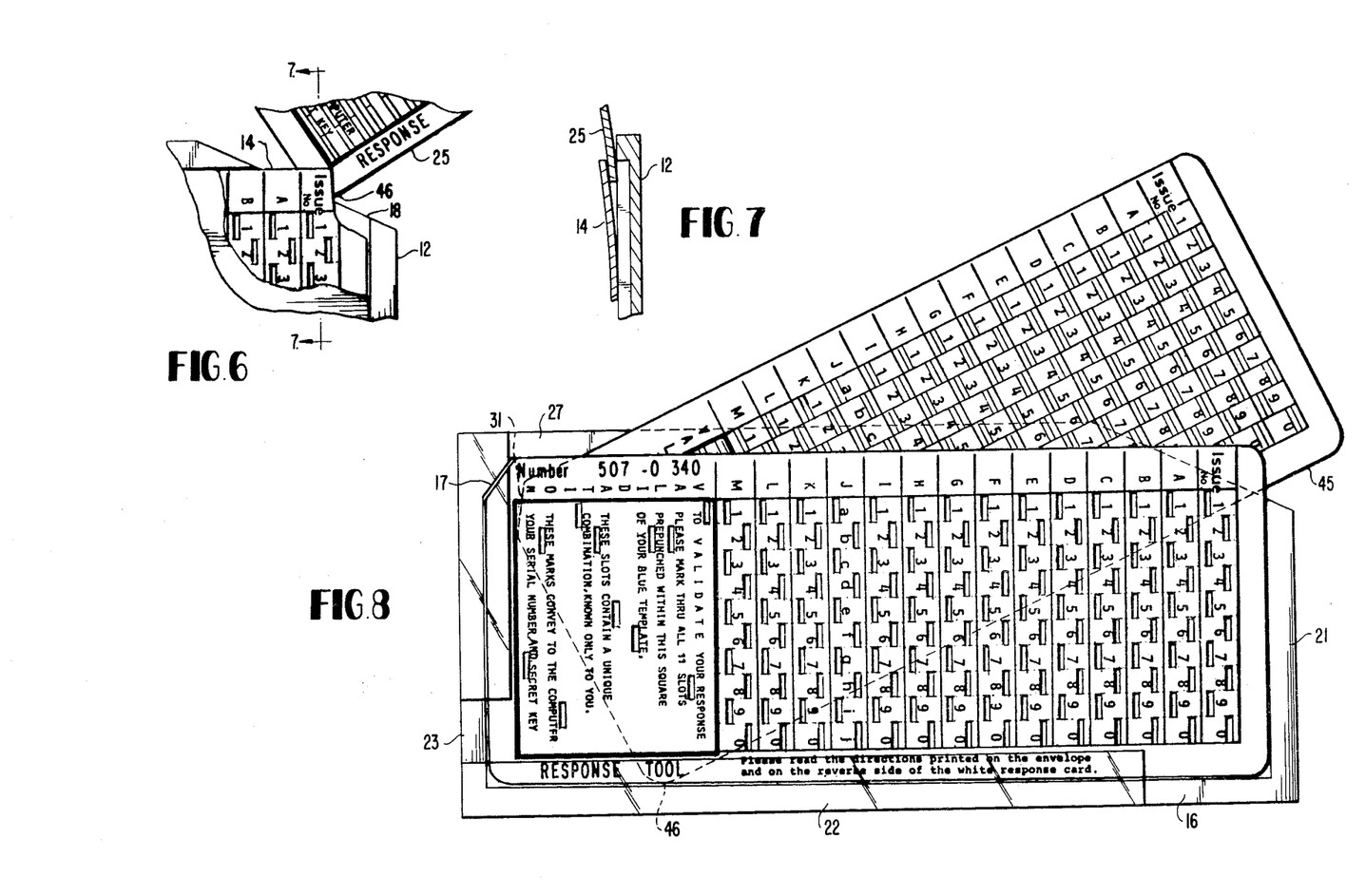
FIG. 6 is a fragmentary view illustrating the manner in which a marking message card is inserted into the template assembly illustrated in FIG. 1.
FIG. 7 is a sectional view taken along line 7—7 of FIG. 6, and having an expanded horizontal scale to show detail.
FIG. 8 is a plan view of a template assembly with the message card being inserted therein.

FIGS. 6 and 7 illustrate the manner in which a message card 25 is easily inserted by the user in the novel template assembly 10 illustrated in FIG. 1. The lower left corner 46 of the message card is inserted into the notch 18 of the base member 12 and under the upper right corner of the template 14 so that the template may be easily lifted by the message card to permit the message card to be inserted into the template assembly.

While the message card 25 is being inserted, its lower left corner 46 will reach the inside surface of the lower long portion 22 of the rim 16 (see FIG. 8). Since the corner 46 is round, it slides smoothly to the left along the rim 16 and at the same time the message card pivots clockwise. This causes the lower edge 45 of the message card to become parallel to the lower long portion 22 of the rim 16, and continue to slide on the inner surface of the rim until the entire message card 25 fits precisely into the cavity formed by rim 16 and more specifically by its four portions 21, 22, 23 and 27.

Thus, the marking openings in the template 14 are aligned with the marking areas on the message card. The rim portion 23 (see FIG. 8) has a slanted portion 17 which mates with diagonally cut corner 31 of the card 25 (see FIG. 4). This mating serves as a check that the message card is inserted correctly. A mark then may be accurately made on a desired area of the message card by inserting a pencil through the corresponding opening in the template.

It is also contemplated that the novel template 14 be used alone, i.e., not as a part of the novel template assembly 10, by placing it over a message card and aligning the template openings with the corresponding marking areas on the message card.

Since the purpose of the template assembly is to facilitate marking by millions of clerically unskilled citizens, it is of greatest importance to achieve the utmost ease of message card insertion. The described structure, a result of extensive studies and development, enables a clerically unskilled person, after seeing once on television how to handle the template, to learn how to insert the message card in an easy, fast, continuous movement by holding the template assembly in the palm of one hand and inserting the message card with the other hand.

The location of indicia in lines parallel to the short edge of the card permits a person to hold the template assembly in the palm of one hand while marking with a pencil held in the other hand.

The jacket-like structure holds the message card firmly within the rim. When the assembly is held with the rim portion 23 down and the rim portion 21 up so that the indicia are read in the normal manner, the gravity of the message card keeps it resting on the short left portion 23 of the rim and in a pocket formed by base plate member 12 and the template 14 joined by short plastic strip 29 (see FIG. 3). This novel structure and the novel arrangement of the indicia make marking effortless. This structure does not require a table or another hard support surface, thus marking could be performed while watching television or responding to a speaker addressing a meeting.

The present structure minimizes the touching of the template card with fingers, thus extending the lifetime of the template. To further strengthen the template, the bottom and top rows of openings have been eliminated.

The structure, described in said pending application and using a hinge, did not prevent the slippage of the message card over the lower portion of the rim while inserting the card, thus occasionally causing the need for additional motion of both hands to position the message card within the rim. It also required holding the template assembly between the index finger and the thumb to prevent sliding of the message card while marking it, and then it also required moving the template assembly in order to mark through the openings initially covered by the thumb.

These motions would expose the base member 12 to a bending stress while marking, thus requiring a stronger base member, which is not only more expensive to make, but is also heavier, thereby requiring more postage when initially mailing template assemblies to millions of participants.

Thus the novel template assembly structure is a significant improvement. It not only makes usage easier for the participants, thus contributing to a greater volume of response, but (by reducing the cost of postage and manufacturing) also faciliates the logistics of the involvement of millions of citizens in mass participation feedback to issues and questions addressed to citizens by public officials, for example.

Thus, it can be seen that I have invented a novel template assembly and a novel optically readable message card for use with the template assembly. The novel template assembly permits a non-skilled user to mark the message card marking areas so that marking errors are eliminated. As pointed out above, in order for a mark on a message card to be read by commercially available optical mark readers, the marks must be of a certain minimum vertical length, as indicated, for example, by the rectangular boxes 30 and 34 in FIG. 4. It can be seen that, if the marking areas for the indicia in a column, such as the column in field 26 in FIG. 4, were located one below the other, the vertical openings in the template would run together and form one continuous vertically-extending slot in the template. With such an arrangement, the person using a pencil to mark the marking areas on the message card beneath the template could very easily permit the pencil mark from one marking area to extend into the vertically adjacent marking area, thereby causing a readout error when the message card is optically scanned. By contrast, horizontal staggering of vertically adjacent template openings do in effect provide two vertical columns of template openings for each column of indicia, thereby eliminating the possibility of error in marking the message card. Furthermore, as previously explained, the use of these staggered template openings results in a structurally strong template while at the same time keeping to a minimum the horizontal distance between columns as well as meeting the requirements of the commercially available optical mark reading equipment. The minimum length required for a mark to be optically read is 0.170 inch on recent IBM type 3505 readers. Tests have shown that the template openings must then be 0.250 inch long to assure a mark of this minimum length.

The message card itself may be of any form or weight of paper or plastic acceptable for mark reading.

The proposed audience communication system can be used for obtaining an input from a very great number of individuals for applications such as opinion polls, elections, accounting services, mail ordering, etc. The template openings in the validation section of the template 14 are unique to a particular user. The validation code contains a consecutive template serial number and a secret security code which is randomly generated for each template by a computer program. The incorporation of a secret security code into a template is a novel feature which prevents unauthorized responses. In order to mass produce such individually coded templates 14, the use of a computer-controlled high-speed punch producing openings 0.250 of an inch long is necessary.

The computer associated with optical mark reading will recognize in each run only the last response to each issue for a particular individual template number and security code. A user may change his response by sending another response later. The computer would then recognize the last response as a valid change and would adjust and update all results in the computer system memories and also enter into periodic accumulations, thereby indicating the types and volumes of response changes.

The provision of the personal and confidential template number and security code embodied in the individual validation pattern is an important feature of the template 14. The user is informed that no one else has the same validation pattern and no one else knows his template number and security code. The user is requested to include his area identification and his demographic profile in his first response, and from that moment the computer will associate all future responses with the user's area and enter his input into proper demographic accumulations.

After the marked message cards and processed, there is made available for each area a print-out of responses which are listed in template number sequence, thus providing to any user a full audit trail, allowing his to verify easily his response on a displayed or mailed printout, while assuring his privacy.

The template assembly and message cards described are particularly suited for a television audience response system where a subscriber receives in a sealed envelope a template or a template assembly with prepunched individual validation openings. For example, when the user is viewing a television program, the television announcer will indicate that the user should mark an issue number, for example a "1", in the Issue field and then a response to question "A" by marking a choice "1" or "2" in line "A", etc. Then the announcer would remind the viewer to mark the validation pattern. The marked message card is then mailed to a processing center, and, since each message card contains all the necessary information, i.e., the television program (issue) involved, the viewer's responses and his validation pattern, the computer will be able to accumulate all desired territorial and demographic totals.

Use of the individual serial template number and security code to permit a citizen to change his previously entered response on a first message card is important, since it permits a determination of the degree of change of public opinion caused by the impacts of various events, such as domestic, foreign, political and military speeches and other events.

It is contemplated that responses and changes will be accumulated over a period of a year so that final responses are continuously stored in the computer memory. In order to keep the response to public opinion questions current, it is contemplated that computer memories will be cleared at the end of a predetermined time, for example, at the end of a year.

Even though an IBM card has been illustrated, it is to be understood that a message card of any size could be used. Of course, the template and/or template assembly would then be designed to match the particular message card being used.

The marking template mechanically limits the length of the mark and thus prevents overdrawing it on a properly aligned message card. However, some clerically unskilled citizens may not align the card properly, and thus overdraw into the portion of the next vertically adjacent mark reading area. Moreover, in many mass applications the marking message cards are mailed to postal patrons who are not supplied with the templates.

Overdrawing of marks is a factor which decreases the volume of messages recognized as valid by the computer, because the hardware microprogram built into the IBM type 3505 Card Reader with OMR feature erases the signals if a card column contains an incomplete mark.

Since the microprogram is activated before properly marked data from other marking areas could enter the central processor, such otherwise valid data will be erased.

It would be economically inadvisable to develop an entirely new card reader for the purpose of processing message cards containing the overdrawn marks. Therefore, an input switching circuitry according to this invention serves as an attachment to be interconnected into an existing card reader, such as, for example, an IBM type 3505 with an OMR (Optical Mark Reading) feature, which is disclosed in U.S. Pat. No. 3,560,751 and U.S. Pat. No. 3,706,887, both assigned to International Business Machines Corporation, Armonk, New York.

An IBM OMR card contains eighty columns, and each data column consists of one marking column having twelve vertically adjacent marking positions. For each of these positions an identical but separate circuit, such as shown in FIG. 2 of U.S. Pat. No. 3,706,887, is available within the OMR feature.

The message card as shown in FIG. 4 of the present application contains in its message fields two marking columns for every column of data, with one marking column containing odd marking areas designated as "1", "3", "5", "7", "9" and "R", and the other column containing the even marking areas designated as "L", "2", "4", "6", "8" and "0". (L and R are potential marking areas located respectively on the left and right margins of the message card, but omitted from FIG. 4 for the sake of clarity. These L and R marking areas will be introduced to the public at a later time to expand the capacity of the message card, after the citizens have familiarized themselves with the ten marking areas of the present introductory message card). Therefore, two different circuits must be available, one shown in the center of FIG. 9 for the marking rows containing the odd marking areas, and another shown on the right-hand side of FIG. 9 for the marking rows containing the even marking areas.

In order to accept marks made only in the assigned areas of each marking column, and to ignore marks in the unassigned areas, these circuits have to be activated alternately at the time the alternate marking columns, containing odd or even marks, are read.

As shown in FIG. 4, the message card may also contain reference fields, such as validation, where every data column consists of only one marking column which contains both odd and even marking areas. Therefore, the input switching circuits must also provide, as described further on, for the reading of all marking areas in every column in a reference field.

Figure 9:
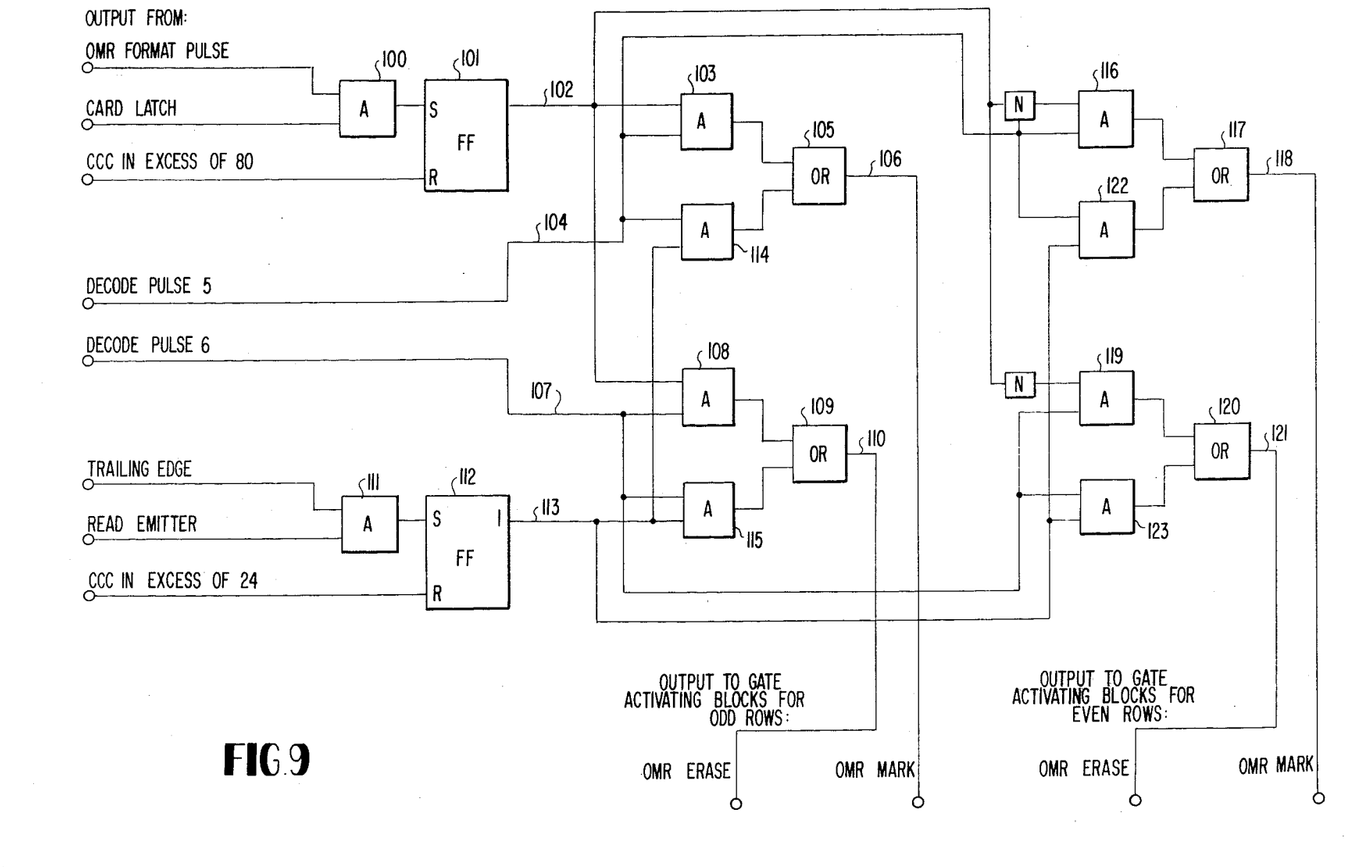
FIG. 9 is a logic diagram showing the components of the marking areas' switching solid state circuitry.

For the purpose of explanation of the functioning of the switching circuits shown in FIG. 9, we shall consider the OMR format of the message card, for example as shown in FIG. 4, where the OMR columns are located in odd-numbered card columns 3, 5, 7, . . . 79. (Card columns 1 and 2 are reserved for End of File code.) Out of these, the reference field consists of marking columns located in card columns 3, 5, 7 . . . 23 containing vertically adjacent marking areas for all indicia, while the message fields consist of marking columns located in card columns 25, 29 . . . 77 which contain marking areas for only the odd indicia, and marking columns located in card columns 27, 31 . . . 79 which contain marking areas for only the even indicia.

FIG. 9 is a logic diagram of my switching circuit which will permit the IBM optical card reader to read the novel message card with staggered marking columns. The circuit will be described in connection with the timing chart of FIGS. 11a and 11e. The timing chart is patterned on the IBM timing chart shown in FIG. 4 of U.S. Pat. No. 3,706,877, and both my timing chart and circuit are compatible with the disclosure of that patent, which is expressly incorporated herein by reference.

According to the above example of a message card, the OMR FORMAT pulse output will be provided by the IBM OMR circuit at the eleventh pulse count for card column 1 as shown in the timing chart in FIG. 4 of U.S. Pat. No. 3,706,877 and in the timing chart of FIG. 11 of this application. This output is ANDed in an AND circuit 100 with the CARD LATCH output supplied by latch 60 shown in FIG. 2a of the IBM patent to activate a FLIP FLOP 101 whose output is delivered over the line 102 and ANDed in AND circuit 103 with the DECODE 5 PULSE output provided on line 104 by the IBM OMR circuit (and corresponding to "COUNT 5" in FIG. 2b of the patent). The output of AND 103 is applied through the OR to line 106 which delivers this output to the AND 84, shown in FIG. 2b of the patent, to activate GATE OMR MARK for transmitting during the card column 2 cycle the signals read from the previous card column 1. The next OMR FORMAT output pulse will occur during the card column 3 cycle and will drive to zero the output of the FLIP FLOP 101. The following OMR FORMAT output will reactivate the output of FLIP FLOP 101 during card column 5 cycle, and so on alternately, until the card column count, CCC IN EXCESS of 80, resets FLIP FLOP 101 to zero.

Figure 11:
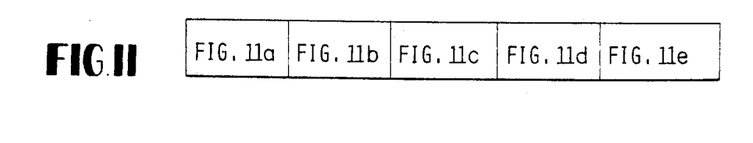
FIG. 11 (including FIGS. 11a, 11b, 11c, 11d and 11e) is a timing chart.
Figure 11A:
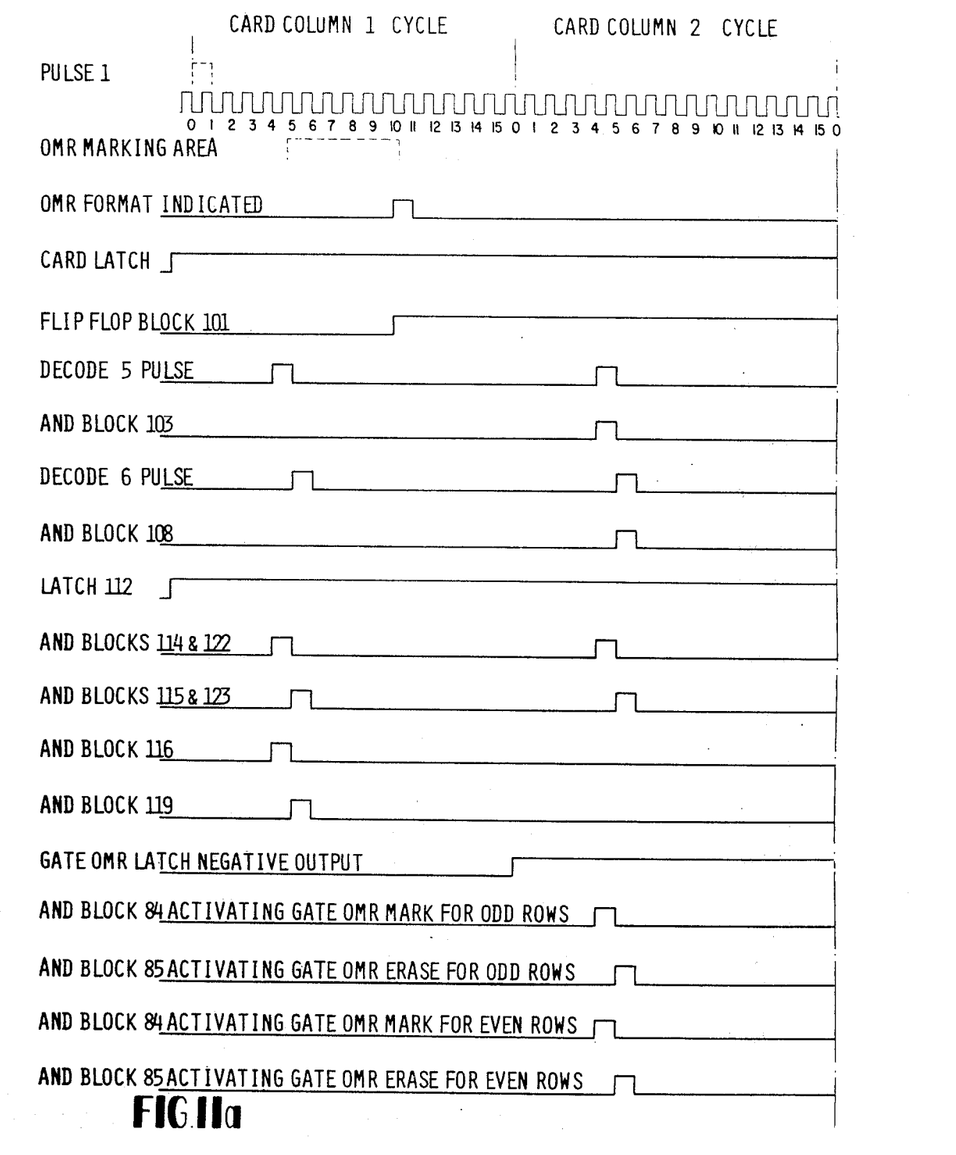
Figure 11B:
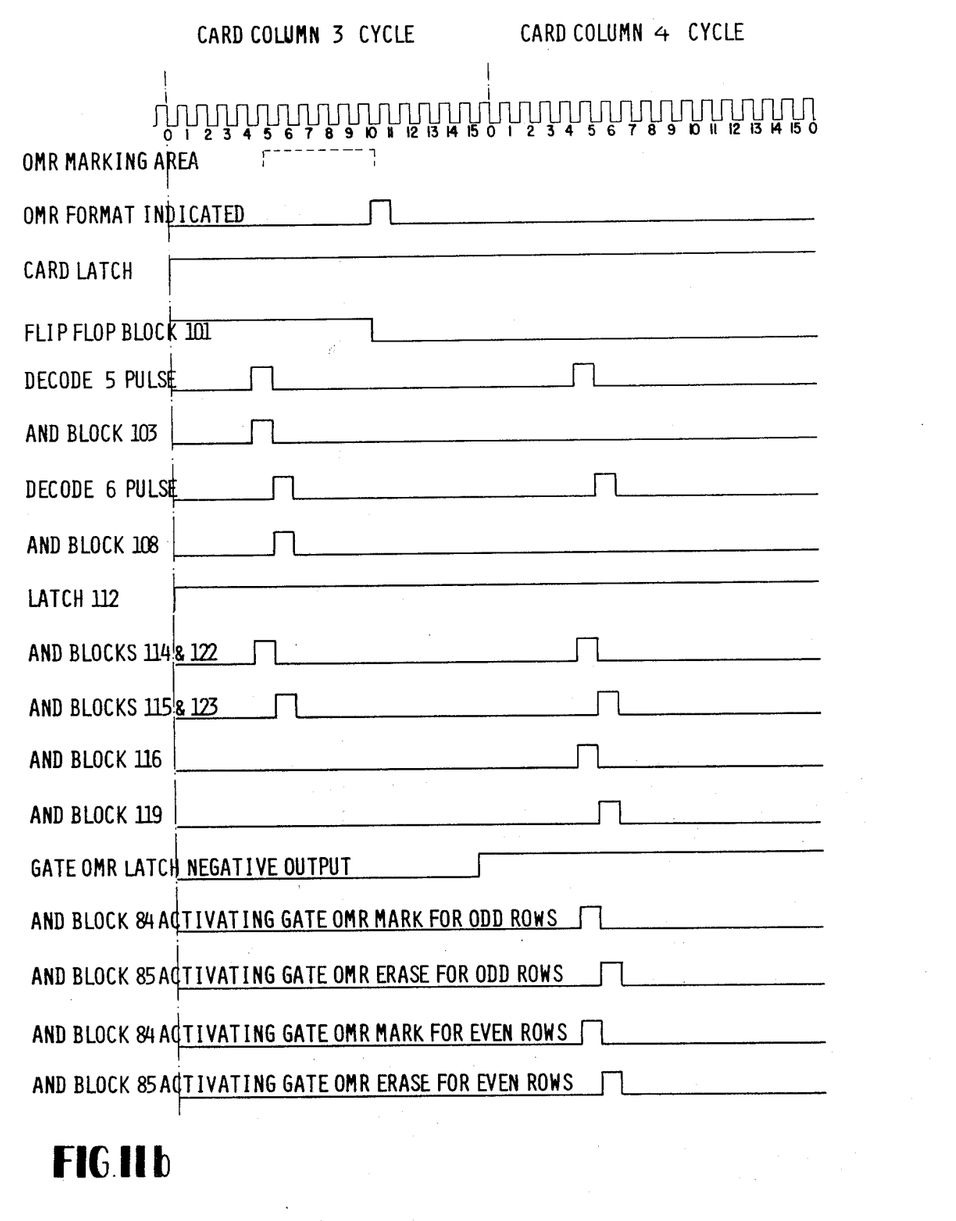
Figure 11C:
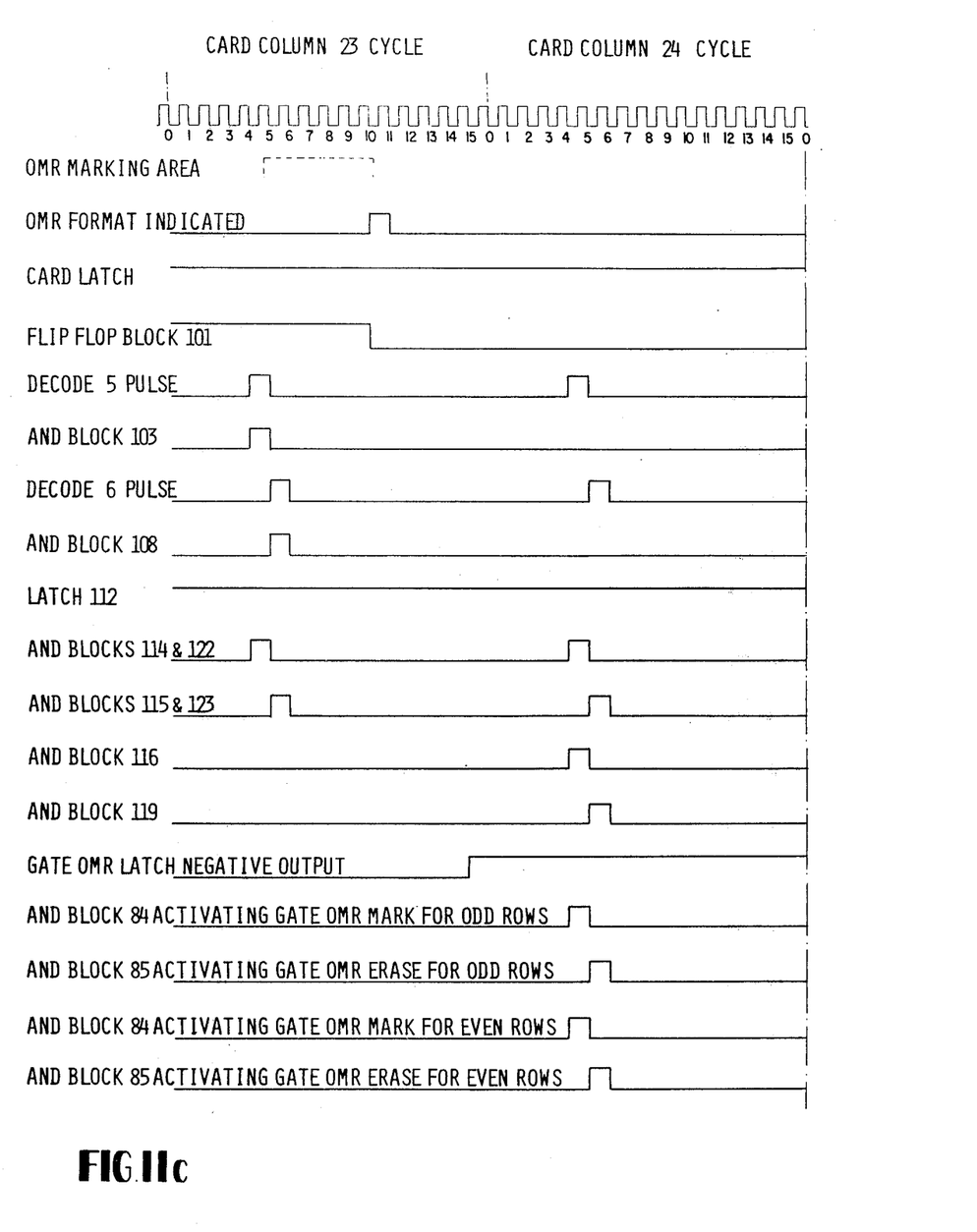
Figure 11D:
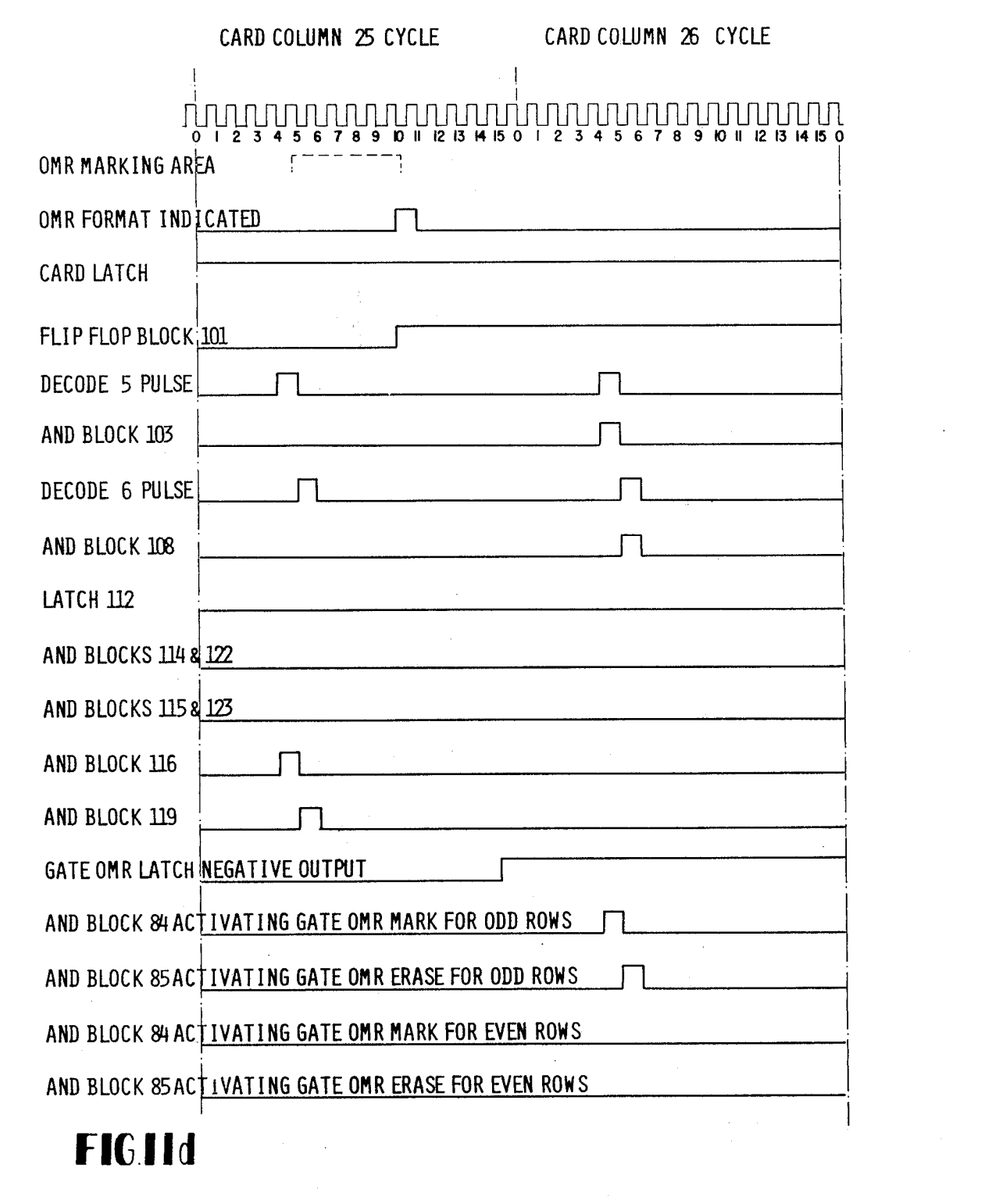
Figure 11E:
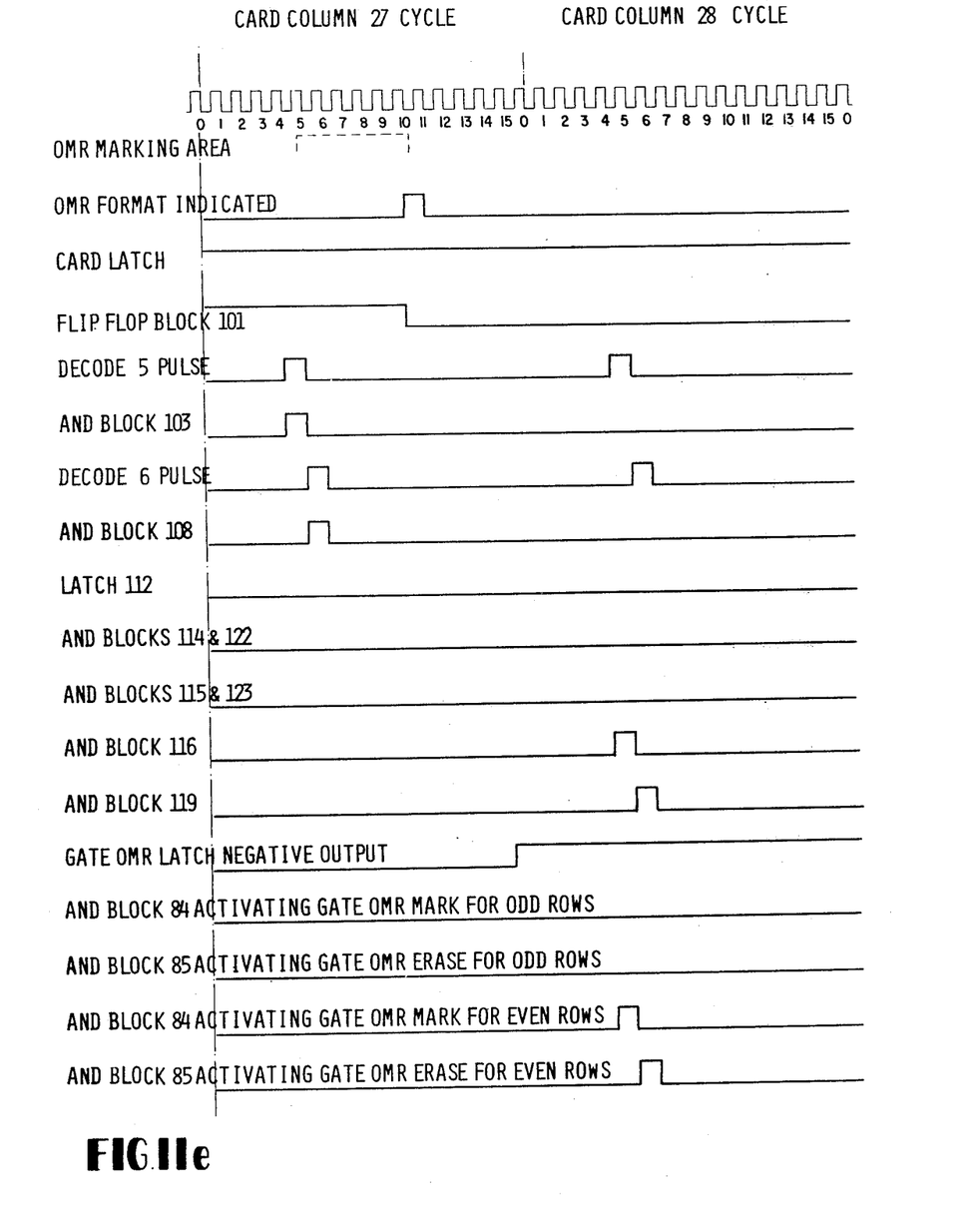

Thus, the output of FLIP FLOP 101 will be alternately activated for two card column cycles and then deactivated for two card column cycles. For example, this output will be available from pulse count 11 of card column 1 cycle through pulse count 11 of card column 3 cycle, then deactivated until pulse count 11 of card column 5 cycle, and so on. Therefore, the output of AND 103 will be delivered through OR 105 to line 106 during the early part of card columns 2 and 3, but deactivated during card columns 4 and 5. Likewise, it will be delivered during card columns 6 and 7, 10 and 11 . . . 22 and 23, 26 and 27 . . . 78 and 79. However, since the negative output GATE OMR LATCH (latch 81 in FIG. 2b of the IBM patent) is available only on even card columns, the OMR MARK output delivered on line 106 will be ANDed in AND 84 of the IBM OMR circuit to activate GATE OMR MARK only during card columns 2, 6 . . . 22, 26, 30 . . . 78.

Likewise, the output DECODE 6 PULSE on line 107 is ANDed in AND 108 with the output of FLIP FLOP 101 and applied through OR 109 to line 110, which delivers an OMR ERASE output to the AND 85 in the IBM OMR circuit to activate GATE OMR ERASE. This gate will be activated during card columns 2, 6 . . . 22, 26, 30 . . . 78 due to the conditions described above for the activation of GATE OMR MARK. It should be noted that these card cycles follow the card columns containing the odd marking areas. Thus the described portion of the circuit, shown in the center section of FIG. 9, provides means for selectively transmitting signals from the odd marking rows, while ignoring the even marking rows.

The trailing edge photo transistor (39 in FIG. 1 of the IBM patent) of the IBM OMR card reader delivers to AND 111 a TRAILING EDGE output which, in combination with the next succeeding READ EMITTER pulse from the read emitter pick-up 35 (FIG. 1 of the patent), sets the latch 112, whereupon the output thereof, delivered over the line 113, is ANDed in AND 114 with the DECODE 5 PULSE, delivered over the line 104. The output of AND 114 is applied through OR block 105 to line 106 and provides an additional OMR MARK output for activating the GATE OMR MARK throughout the reference field portion of the message card.

This output will be available at every card column from card column 1 through, for example, card column 24 since the latch 112 will not be reset to zero until the card column cound exceeds, for example, 24. However, since the negative output of the GATE OMR LATCH is available only on even card column cycles, the output on line 106 will be ANDed (in AND 84) only on card columns 2, 4, 6 . . . 20, 22, and 24 and will activate GATE OMR MARK on these cycles only.

Likewise the output of DECODE 6 PULSE on line 107 is ANDed in AND 115 with the output of the latch 112 and applied through OR 109 to line 110. Thus, the GATE OMR ERASE will be activated additionally during card columns 2, 4, 6 . . . 20, 22, and 24, due to the conditions described above for the GATE OMR MARK.

The right-hand section of FIG. 9 shows the circuit providing the means for selective transmission of signals originating in the even marking rows, while ignoring the odd marking rows. This circuit is identical with the one shown in the center of FIG. 9 and described above in detail, except that the output delivered on line 102 is inverted and then ANDed with the appropriate DECODE pulses in AND circuits 116 and 119, respectively. Thus, outputs will be delivered on lines 118 and 121 during card column cycles 1, 4 and 5, 8 and 9 . . . 24 and 25, 28 and 29 . . . and 80. However, since the negative output of the GATE OMR LATCH is available only on even card columns, the outputs delivered on lines 118 and 121 will be ANDed in the AND circuits 84 and 85 to activate the GATE OMR MARK and GATE OMR ERASE of the IBM OMR circuit in even marking rows only during card column cycles 4, 8 . . . 24, 28 . . . and 80. It should be noted that these card column cycles, used for signal transmission, follow the card marking column cycles during which the even marking areas are read.

AND circuits 122 and 123 provide additional output during every card column cycle until the card column count exceeds, for example, 24, and thus assure transmission of signals from even marking areas in all marking columns of the reference section, for example card columns 2, 4, . . . 24 of the message card.

If even card columns 2 through 80 are used for OMR format (instead of odd card columns used in the above description), the OMR FORMAT INDICATED pulse will first occur during card column cycle 2. The sequence of all other pulses will be accordingly shifted by one cycle, thereby retaining the pattern shown in timing charts FIGS. 11a, 11b, 11c, 11d and 11e.

In summary, the circuit shown in FIG. 9, and operating according to the timing chart of FIG. 11, provides for staggered recognition of odd marking areas, such as "1", "3", etc., and even marking areas such as "2", "4", etc., with odd and even marking areas located in alternate columns of the message portion of the message card, and also provides for recognition of all marking areas, both odd and even, in each marking column in the reference portion of the card.

The direct interconnection of the circuits of this invention with the IBM OMR circuit (shown in FIG. 2 of the IBM patent) is very simple, namely: (1) The lines connecting COUNT 5 and COUNT 6 with AND circuits 84 and 85 in the patent are replaced by lines 104 and 107 to be connected with COUNT 5 and COUNT 6 lines, and by lines 106 and 110 in the odd marking rows, and lines 118 and 121 in the even marking rows. The lines 106 and 118 are to be connected to respective AND circuits 84, and lines 110 and 121 to respective AND circuits 85. (2) The inputs to AND circuits 100 and 111 and the reset inputs to latches 101 and 112 are merely connected to the points of the IBM OMR circuit as designated by the line labels in FIG. 9.

The above-described entirely solid-state switching circuit is an embodiment which is preferred to other forms of the invention wherein one would use mechanical or partially mechanical means, such as, for example, a synchronously rotating pattern sensed by phototransistors which would trigger circuits transmitting the signals from assigned odd, even or both marking areas of a message card column.

It should be noted that the circuits according to this invention do not interfere with the normal hole reaching mode and related circuits of the IBM OMR.

Figure 10:
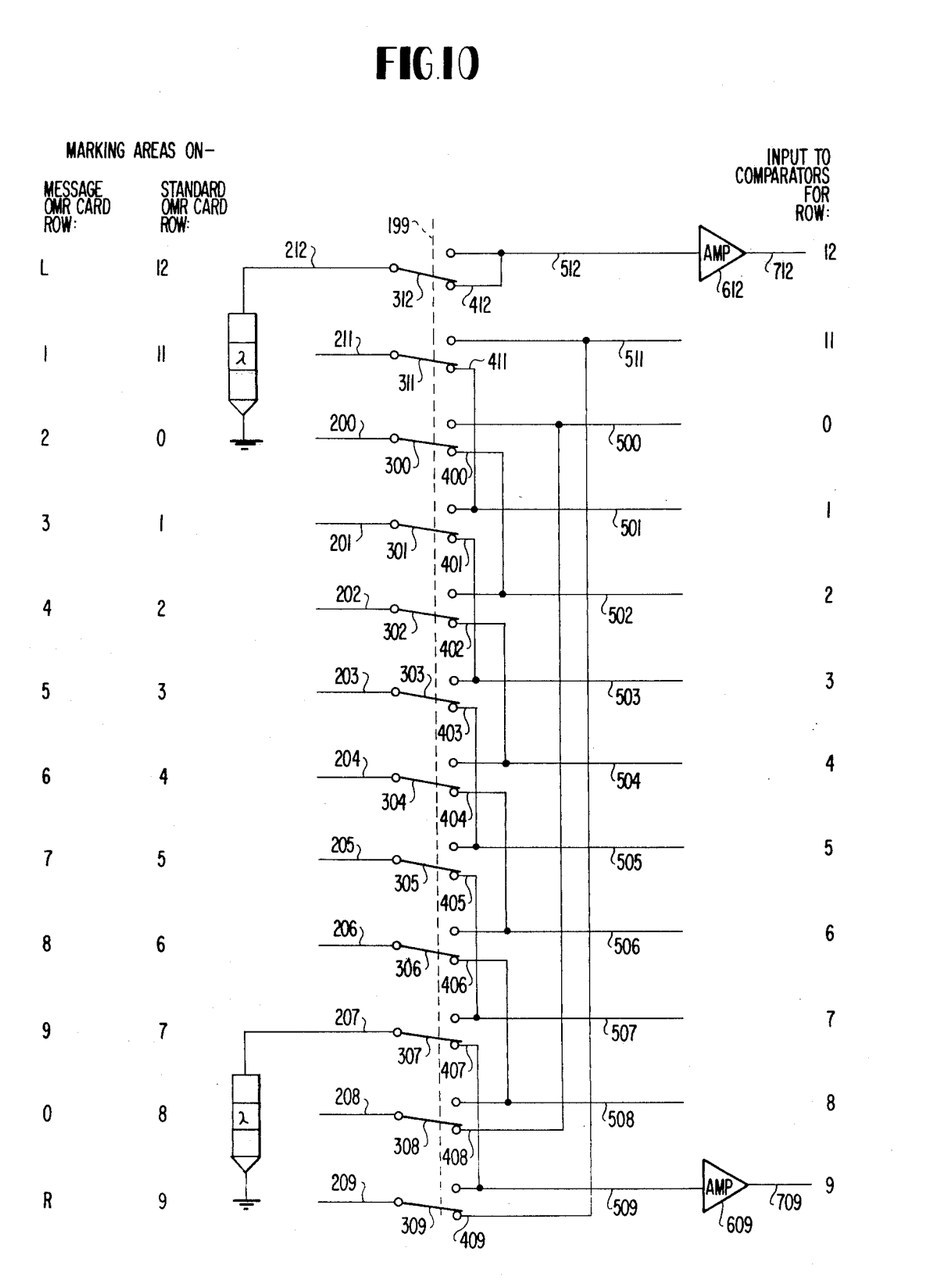
FIG. 10 is a wiring diagram of the input mode, double throw switch.

FIG. 10 shows the wiring diagram of the input crossover circuit equipped with a twelve pole double throw switch 199. In its normal position it connects the array of leads of phototransistors (for example, such as leads 37 shown in FIG. 3 of U.S. Pat. No. 3,560,751) via the normal side contacts and corresponding amplifier to their dedicated comparators, corresponding to the indicia of the standard OMR card.

When the switch 199 is thrown into its transferred position, as shown in FIG. 10, the leads 212, 211, 200, 201, . . . 209, of phototransistors λ, located respectively over the rows 12, 11, 0, 1, . . . 9 of the standard OMR card, are connected respectively by switching members 312, 311, 300, 301, . . . 309 to the transferred side contacts 412, 411, 400, 401, . . . 409. Each transferred side contact is permanently connected to a normal side contact in the manner shown in FIG. 10, so that, when the switch is transferred, there is dedicated to each phototransistor a set of comparators (for example, comparators 48 and 49 of the IBM card reader) corresponding to the indicia of the message card according to the present invention. Thus, for example, the lead 207 of the phototransistor λ located over the standard OMR row "7", which is a row "9" on my message card, is connected through switching member 307 to transferred side contact 407, which is permanently connected to the normal side contact 509, and then amplifier 609 connected to line 709, thereby dedicating the comparators which deliver "9" signals to the central processor.

The switch 199 may be constructed, for example, in the form of a latch wire contact relay mounted close to the phototransistor read head. This relay could be transferred by pushbutton or by a housekeeping program only once for the entire ORM run involving a continuous file of message cards.

The function of the switch 199 could be of course performed by software. However, when reading very large volumes of message cards in each run, it would be very wasteful to use computer time for such repetitive conversions performed for every bit of information, many millions of times. Thus, a simple switch shown in FIG. 10 is a substantial improvement for data processing of my message cards.

While my invention has been particularly shown and described with reference to the preferred embodiment thereof, it will be understood by those skilled in the art that various changes in form and detail may be made therein without departing from the spirit and scope of the invention as defined in the appended claims.

I claim:

1. A marking template assembly for holding a message card containing marking areas thereon, said assembly comprising:
    a generally rectangular base member having a notch in one corner thereof;
    an upstanding rim extending around the periphery of said base member, except for said notch;
    a generally rectangular template of the same general shape as said base member, except for said notch, and sized to fit within said rim to form a card-receiving cavity with one corner of said template extending through said notch, said template having marking openings corresponding to the marking areas;
    a first strip of pressure-sensitive tape securing together the outer surfaces of one pair of adjacent short sides of said template and rim, these short sides being non-adjacent to said notch; and
    a second strip of tape securing together the outer surfaces of only one pair of adjacent long sides of said template and said rim, these long sides being non-adjacent to said notch, thereby forming a jacket-like structure which permits a card to be inserted therein through said notch without any hinging action between said template and said base member.

2. The template assembly as defined in claim 1 wherein said base member is made of plastic approximately 0.040 inch thick.

3. The template assembly as defined in claim 1 wherein the marking openings in said template are rectangular slots approximately one-quarter inch long.

4. The template assembly as defined in claim 1 wherein the card and template are of the same thickness, and the depth of said cavity is substantially equal to two and one-half times this thickness.

5. A method of making the marking template assembly defined in claim 4 comprising the steps of:
    placing a card in the cavity formed by the rim;
    placing the template over the card and within the rim so that the openings in the template are aligned with the marking areas on the card; and
    then applying the first and second pressure-sensitive strips along the short and long sides, respectively, to form the jacket-like structure.

* * * * *